Figure 11:
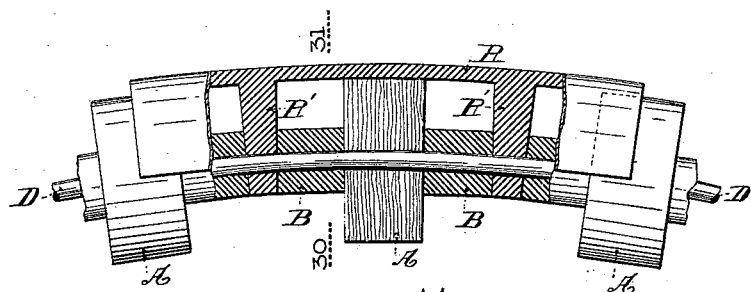

(No Model.) 4 Sheets—Sheet 1.
E. G. WOOD & E. ARMITAGE.
TIRE FOR CYCLE WHEELS.
No. 538,142. Patented Apr. 23, 1895.
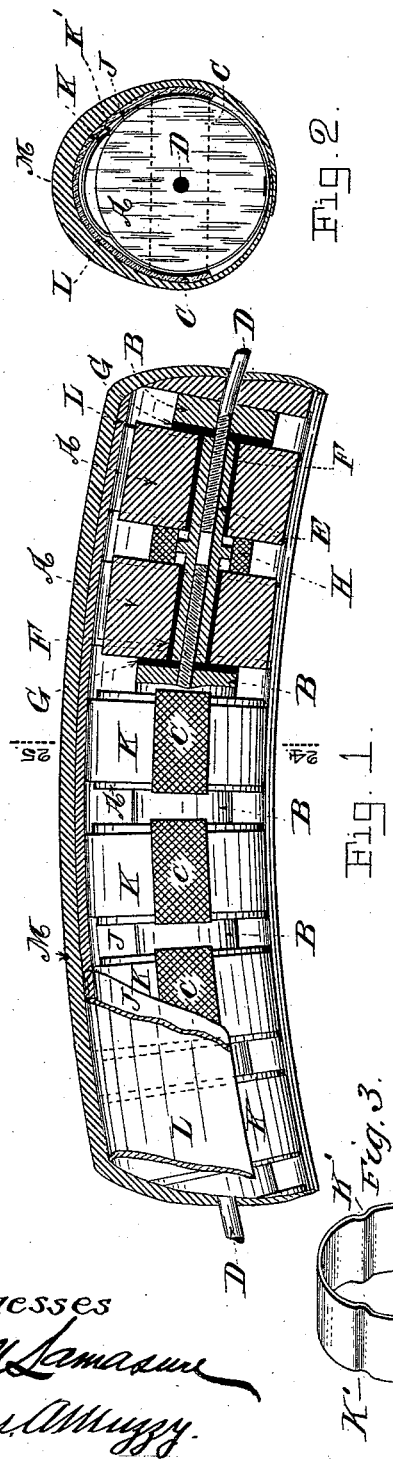
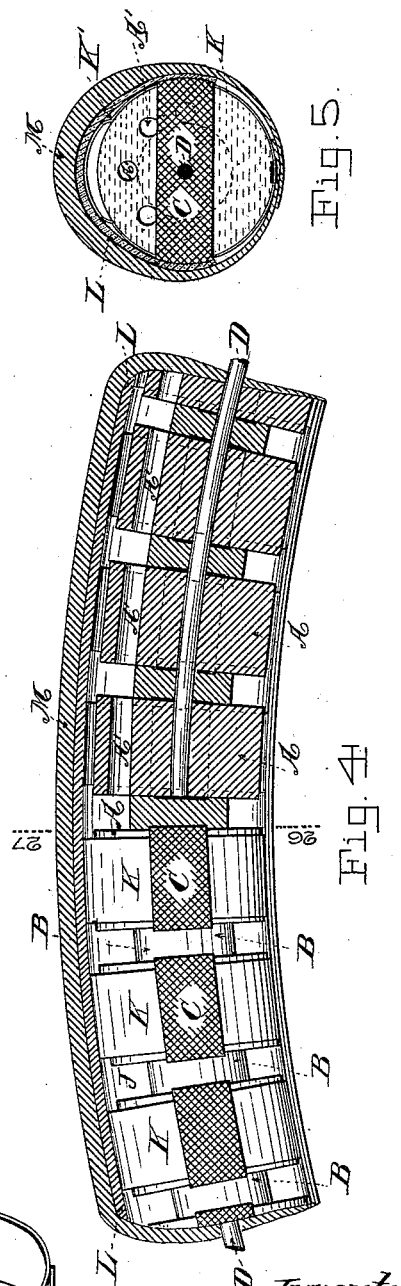
Witnesses
Inventors
Attorneys (No Model.) 4 Sheets—Sheet 2.
E. G. WOOD & E. ARMITAGE.
TIRE FOR CYCLE WHEELS.
No. 538,142. Patented Apr. 23, 1895.
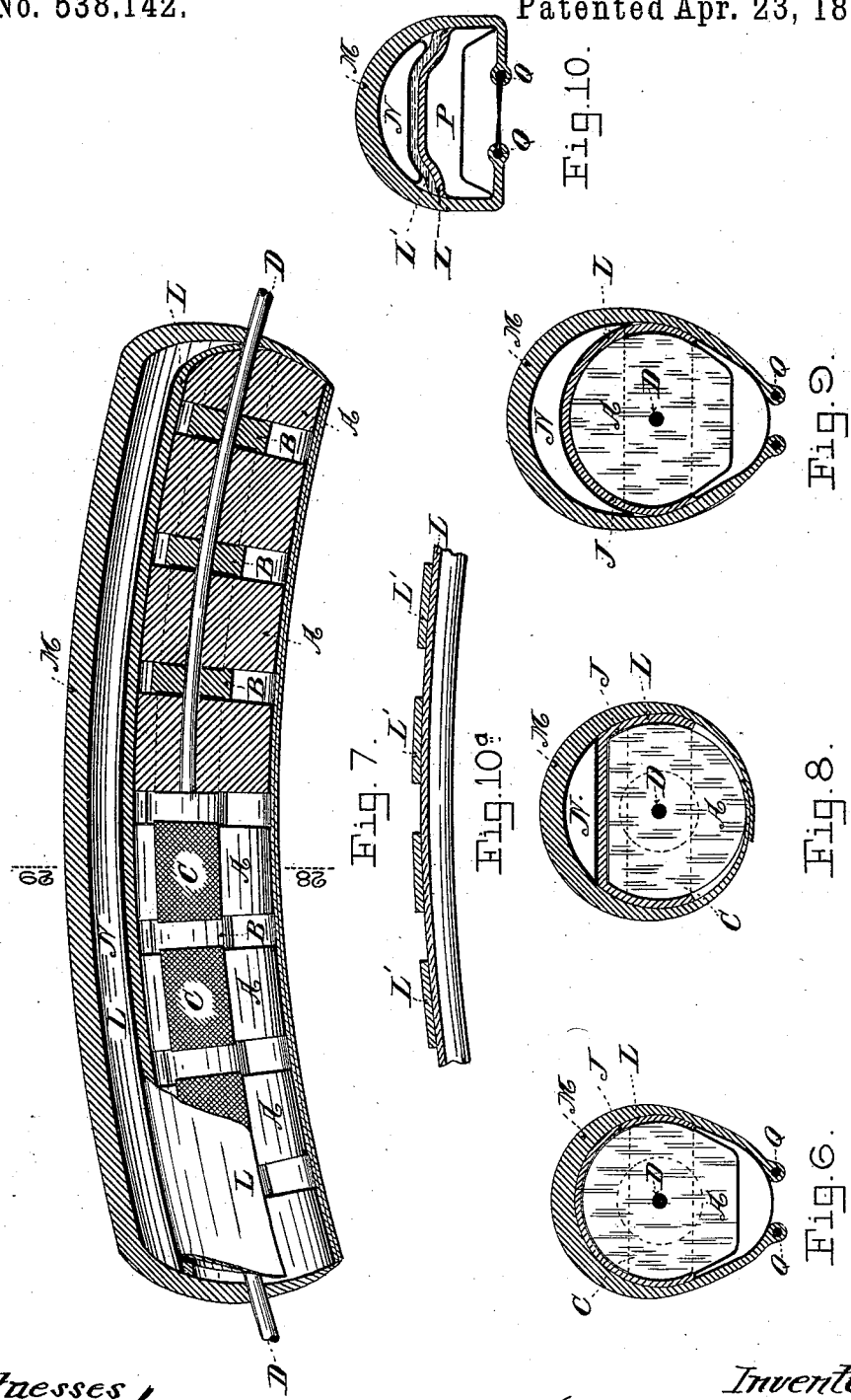

(No Model.) 4 Sheets—Sheet 3.

E. G. WOOD & E. ARMITAGE.
TIRE FOR CYCLE WHEELS.

No. 538,142. Patented Apr. 23, 1895.

Witnesses
Inventors (No Model.) 4 Sheets—Sheet 4.
E. G. WOOD & E. ARMITAGE.
TIRE FOR CYCLE WHEELS.
No. 538,142. Patented Apr. 23, 1895.
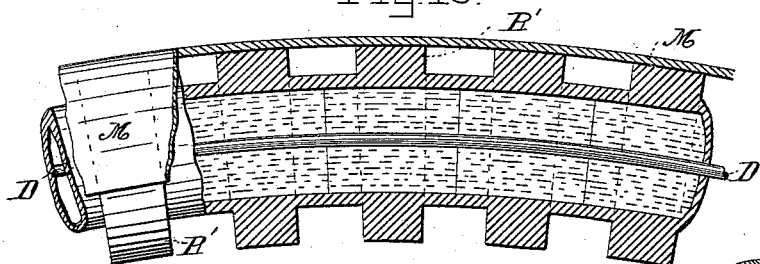
Fig. 15.
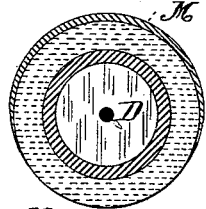
Fig. 16.
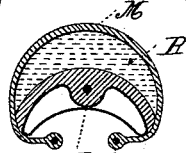
Fig. 18.ª
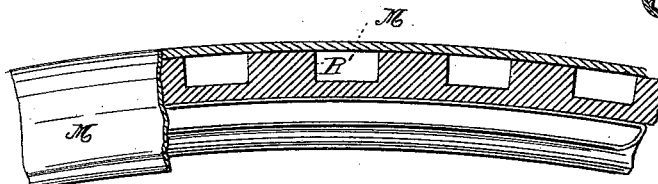
Fig. 17.
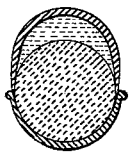
Fig. 18.
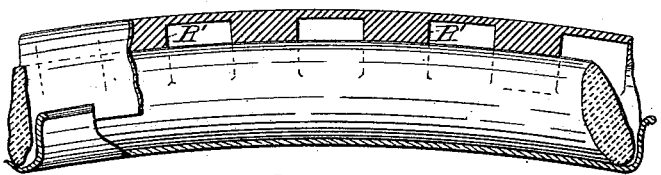
Fig. 19.
Fig. 20.
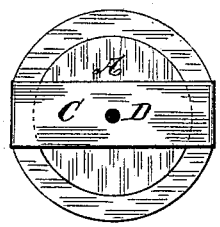
Fig. 21.
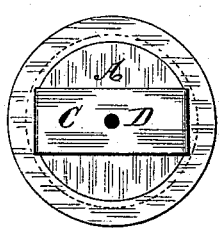
Fig. 22.
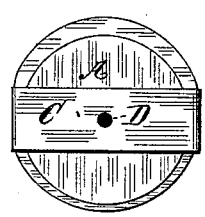
Fig. 23.
Witnesses  
Inventors  
E. G. Wood and Enoch Armitage  
By Alexander & Davis  
Attorneys

UNITED STATES PATENT OFFICE.

EDWARD GREATBATCH WOOD AND ENOCH ARMITAGE, OF LIVERPOOL, ENGLAND.

TIRE FOR CYCLE-WHEELS.

SPECIFICATION forming part of Letters Patent No. 538,142, dated April 23, 1895.

Application filed May 9, 1894. Serial No. 510,629. (No model.)

*To all whom it may concern:*

Be it known that we, EDWARD GREATBATCH WOOD, residing at Upper Parliament Street, and ENOCH ARMITAGE, residing at Scholar Street, off Smithdown Road, Liverpool, in the county of Lancaster, England, subjects of the Queen of Great Britain and Ireland, have invented Improvements in and Relating to Tires for Cycles and other Vehicles, of which the following is a specification.

This invention of improvements in or relating to flexible tires for cycles and other vehicles such as cabs, carriages and the like has for its object to produce a strong and light tire with a flexible tread and by means of which side slip will be prevented. For this purpose the tread of the tire is supported at intervals only by means of a ribbed core that is arranged within a covering or envelope. This core is semi-elastic or flexible and is so constructed that it will not afford support to the covering or envelope at all points around its circumference but only at intervals. Between the core and that portion of the covering or envelope forming the tread of the tire there may be arranged a pneumatic cushion, or a cushion formed of springs. The unsupported portions of the tread of such a tire undulate or yield when in use and thus prevent side slip.

According to one arrangement the core is built up of short blocks of flexible material, preferably cork, of two different diameters arranged alternately end to end, the larger blocks being diametrically bound by encircling bands to prevent their being crushed out sidewise when the tires are to be applied to heavily weighted vehicles. Each of the said blocks is surrounded circumferentially by a finely tempered steel hoop that rests on the block for about three fourths of its circumference, the remaining portion which supports the tread of the tire, being some little distance away from the block so as to allow the tread to yield under pressure.

According to another arrangement the steel bands are dispensed with and the projecting sections of the core are made of flexible material such as rubber, or they may be made of cork, wood or like material between which and the portion of the outer cover forming the tread, an inflated tube is inserted. For some classes of vehicles the wheels may be formed with a hollow rim of the usual section but formed so that the convex portion is toward the outside instead of the reverse, the said rim which is or may be covered with a ribbed casing being arranged to form a core for the outer covering and a suitable inflated tube being provided between the casing on the rim and the cover.

In another arrangement the tire is made up of transverse or intermediate supports with curved flanges made of india rubber molded to shape, the arrangement being such that each flange will rest against the one next to it and so form a complete outer circle, additional core blocks being provided to support the flange portions at intervals. Suitable layers or bindings of canvas are or may be employed to encircle or partly encircle the core previous to the outer casing being fitted thereon.

The core of whatever material it is made may be shaped to suit the section of wheel rim.

Hitherto cycle or other wheel tires have been made solid, tubular, or inflated or in cell like forms, but without a separate movable core or cushion, and in the case of pneumatic tires when the air tube or tubes is or are punctured, the outer cover of the tire becomes slack and unfit for use, whereas according to our invention under similar conditions the core takes the weight. Furthermore as the tread is supported at intervals only, slipping is prevented, the tire yielding slightly when in use, between the blocks and thus gripping the road more firmly than tires as usually constructed.

Figure 13:
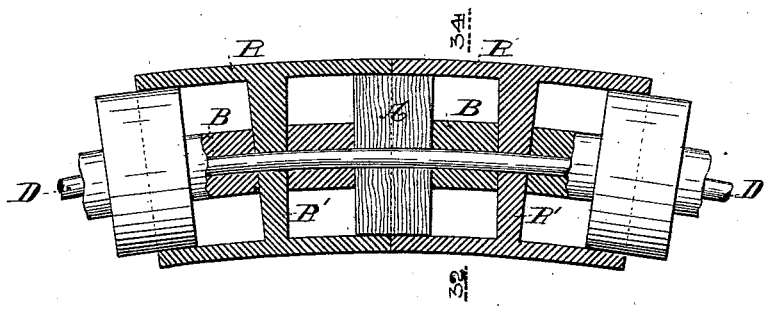
Figure 12:
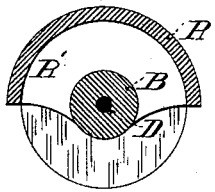
Figure 14:
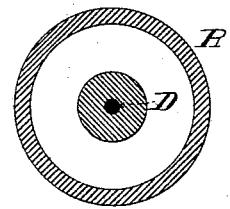

In the accompanying drawings, Figure 1 is a longitudinal sectional elevation of a portion of a tire constructed according to this invention. Fig. 2 is a cross section thereof on line 24, 25 of Fig. 1. Fig. 3 shows one of the steel hoops in perspective. Fig. 4 is a similar view to Fig. 1 illustrating a modified construction. Fig. 5 is a cross section on line 26, 27 of Fig. 4. Fig. 6 is a cross section of a modified form of tire fitted to a hollow wheel rim. Fig. 7 is a similar view to Fig. 1, illustrating a further modified construction of tire according to this invention, and Fig. 8 is a cross section thereof on line 28—29 of Fig. 7. Fig. 9 is a similar view to Fig. 8 but showing the core slightly modified in section and fitted to a hollow wheel rim. Fig. 10 shows another modification in which a hollow rim forms the core and is provided with cross bands to prevent slipping. Fig. 10$^a$ is a sectional detail view of part of Fig. 10. Figs. 11 and 13 are longitudinal sectional elevations illustrating further modified constructions of built up tires according to this invention and Figs. 12 and 14 are cross sections thereof on lines 30 31 and 32 34 of Figs. 11 and 13 respectively. Figs. 15 and 16 are modifications somewhat resembling Figs. 4 and 5 but having the supporting ribs of the core molded on a tubular foundation, and the outer cover cemented or formed with the ribs, the tubular foundation being filled in with cork or the like material. Figs. 17 and 18 show a modification somewhat resembling Figs. 10 and 10$^a$ but in which the air tube is dispensed with, and the projecting ribs are made deeper and molded on a foundation piece, and are covered with an india rubber casing as shown. Fig. 18$^a$ is a cross section of a tire similar to Fig. 18, but in which the outer periphery of the rim is grooved or recessed to receive a rib formed on the ribbed rubber cover which is provided with a retaining wire for holding it in position on the rim either with or without cementing. Figs. 19 and 20 show another modification of our invention as applied to a solid tire. Figs. 21 to 23 show end views of circular supporting sections with the retaining hoops in different positions.

In the construction of tire shown in Figs. 1 and 2 the core or cushion is formed of supporting pieces or blocks A and smaller blocks or distance pieces B both preferably of cork when a light cycle tire is required. The pieces A are bound round in a direction at right angles to the wheel rim, by tape or other bands C, to prevent them from being crushed and widened out when heavily weighted. These bands C can however be dispensed with when the weight to be borne by the wheel is not great as for example in a tire of the front wheel of an ordinary safety bicycle. The blocks A and distance pieces B are threaded alternately onto a central wire D and cemented end to end; the said pieces being firmly held together in ring form upon the wheel rim by connecting the two screw-threaded ends of the wire D together by a long nut or sleeve E, formed with corresponding right and left hand screw threads, as shown in Fig. 1. As will be evident the two ends of the wire D may be secured together in other ways. The two blocks A A at the respective sides of the nut are preferably bushed with tubes F, and provided with metal washers G G for the ends of the nut E to press against. The central portion of the nut E is enlarged to receive a suitable spanner whereby it can be readily turned in either direction. When the core is sufficiently tightened up on the wheel rim, a split india rubber packing ring or filling H is forced between the two end blocks A in which the nut works, to prevent them from moving toward each other.

The blocks A are each encircled by a metal hoop K, which form a spring cushion for the cover each being shaped to suit the periphery of the piece A and wheel rim to which it is applied. When a circular form of core is employed as in the arrangement being described (and also in that shown in Figs. 4 and 5) each hoop K grips its block A tightly for about three quarters of the circumference, the remaining portion, which supports the tread portion of the tire covering, being arranged at a short distance from the periphery of the supporting piece as shown. The hoops K are made of strips of finely tempered steel and bent into suitable circular or other sectional form and the ends connected together by a plate and rivet or the like, or the hoops may be rolled or blocked. They are preferably made with two or more slight corrugations K' K' as shown in Fig. 3 to prevent the steel from kinking and breaking off if unduly strained before coming in contact with the supporting pieces A. The hoops K are usually a little narrower than the width of the pieces A as shown in Figs. 1 and 4 but in some cases, according to the class of wheel tire required, they may be somewhat wider and have their edges slightly turned or rounded inwardly to prevent cutting of the outer covering material. In some cases they may be formed with circumferential corrugations to give increased resistance.

Each steel hoop K may be held tightly in position on the blocks A by simply being inserted between the block A and its band C as in the examples shown, or additional bands may be employed to prevent them from springing away from the blocks A at points below the center line of the core.

Around the hoops K and the blocks A, a tightly fitting layer J (Fig. 1) of material such as canvas, is or may be stretched and cemented to the hoops K, bands C and projecting edges of the blocks A. This layer J may, according to circumstances, wholly or partly encircle the tire core. On the outside of said layer another and thicker covering L of canvas is provided. It is soft, felted on its inner side and is covered with rubber on the outer side. It extends some little distance around the core on each side of the tread of the tire. For example it may be for a distance of a little more than half of the circumference of the tire as shown in the drawings. The covering L is cemented to the covering J and forms a pad to prevent the hoops K from acting injuriously on the ordinary outer covering M which is placed over the core thus formed. This outer cover may be thickened on the tread as shown and be secured in place by any of the well known means.

The blocks A and distance pieces B forming the core may as hereinbefore stated be made of cork, india rubber, wood or other like material, according to the class of wheel tire required. When made of india rubber a number of holes A' may be formed through those parts of the blocks A which are near the tread or outer periphery of the tire as shown in Figs. 4 and 5 for the purpose of rendering them more resilient.

In the construction shown in Fig. 6, steel hoops K are dispensed with, the canvas coverings J and L being laid directly upon the blocks A which are shown applied to a hollow wheel rim the inner side of the blocks being correspondingly shaped.

In the modification shown in Figs. 7 and 8 in lieu of the steel spring hoops K an inflated tube N is employed which is inserted between the coverings L and M to serve as a cushion for the tread portion of said cover M. To form an annular space for this air tube, each supporting piece A is flattened at its outer side so as to form with the outer cover M a passage having the form in cross section of a segment of a circle.

Fig. 9 illustrates a further construction in which the form of the passage in which the air tube N is inserted, is of crescent shape in cross section, the supporting pieces A being of rounded form on their outer periphery. The inner side of each block A is shaped to fit the wheel rim.

In the construction shown in Fig. 10 the wheel rim P is hollow and is arranged with its transversely convex surface outward so as to serve as a core or support for the tire cover M, should the air tube N, arranged between them become punctured.

A layer L of material such as felting or canvas is stretched tightly over the convex tread or outer surface of the wheel rim to which it is cemented, and cross pieces L' (Figs. 10 and 10ª) of canvas or other suitable material are cemented thereto at a short distance apart so as to form projecting ribs which act in a similar manner to the before mentioned pieces A to prevent slipping of the tire when in use.

In the arrangement shown in Figs. 17 and 18 the air tube N is dispensed with and ribs R R are substituted therefor these being of rubber molded or formed on or with a strip of a similar material that is cemented to and rests on the convex wheel rim. In this case the ribs are made sufficiently deep to give the required resiliency and are covered over with an outer casing which may be cemented to the ribs or be removable and connected to the wheel rim by encircling wire hoops in any of the well known ways. Between each rib R a layer of cord may if desired be placed.

The outer covering M may if desired be firmly cemented to the before mentioned tire foundation and its reduced tapered edges made to overlap each other and be cemented together as shown in Figs. 2, 5 and 8; or the covering M, according to the class of tire required, may be made removable and be secured in position on the wheel rim in any well known way such as by wires Q (Fig. 9) secured to the edges of the casing, or they may be drawn taut by cross lacing or be otherwise secured in place. The air tubes N shown in Figs. 7, 8, 9 and 10 may be formed by cementing a separate strip of india rubber at its edges to the outer covering M or an independent inflating tube may be used which may or may not be cemented to the covering M. The inflating valve, which is not shown, may be connected to the air tube in the ordinary manner.

The blocks A may alternately be composed of india rubber and cork or each one may be composed of cork and india rubber combined or of cork, india rubber and wood combined (Figs. 21, 22 and 23). We find in practice that by constructing the core with projecting blocks such as A which for light tires such as are suitable for cycles, we prefer to form of cork, the unsupported portions of the covering between the said blocks A yield or undulate when in use and thus slightly corrugated surfaces are formed which prevent side slip on a greasy path without in any wise detracting from the resilience of the tire.

When the outer covering M is applied as shown in Figs. 2, 5 and 8 at the point where the two ends of the strip from which it is made are joined a removable tongue or flap piece not shown is provided on one or both sides of the covering and in the canvas lining, to allow of the insertion of a screw key or spanner for the purpose of rotating the nut or sleeve E; and Figs. 11 and 12 show another construction of tire comprising a flexible core that may or may not, according to requirements, have an outer casing. In this arrangement an annular ring R is employed. It is of concavo convex form in cross section and is made either in one piece or in sections. It has a number of inward projections or ribs R' that do not extend sufficiently far to bear upon the wheel rim although they may do so if desired. Blocks A and distance pieces B are provided between the ribs R' and the whole is secured together by a wire D and coupling nut as in previous examples.

In the modification shown in Figs. 13 and 14 the rim is built up of tubular sections R having a central cross web R' a block A being arranged within and between each pair of sections so as to support the free ends of the tubular sections as shown, the said pieces A being held in position on the central wire D by smaller distance pieces B.

Figs. 15 and 16 show another modification in which the core is formed of projecting ribs molded with or onto a tubular body part of which is filled with cork or the like material placed tightly around the central retaining wire. The outer casing in this case is of rubber and is formed with or cemented to the ribs. It is sufficiently wide to allow the edges to take within the flanges of the wheel rim.

By this arrangement packing pieces such as B may be dispensed with, the tire being molded in one length and the ends joined together and held in position as before described.

In the modification shown in Figs. 19 and 20, the ribs are similar to those shown in Figs. 17 and 18 with the exception that they are formed with and inside the outer casing and are cemented or otherwise secured to an ordinary solid or cushion tire of a cycle wheel as shown in Fig. 20.

The tire may be modified in cross section to suit various forms of vehicle wheels without departure from our invention.

What we claim is—

1. A tire comprising one or more outer covers and a ribbed core formed of supporting sections and distance pieces of different diameters each supporting section being provided with an encircling strengthening band and a retaining wire or ring on which said supporting sections and distance pieces are threaded alternately, substantially as herein described.

2. A tire comprising an outer cover, a core, said core consisting of supporting sections, independent spacing blocks separating said supporting sections and of a smaller diameter, means for connecting the supporting pieces and the spacing blocks, and means for separating the outer cover from the periphery of the core at the tread of the outer cover, whereby a continuous air space is formed between the core and the outer cover at the tread thereof, substantially as described.

3. A tire comprising an outer cover, a core, said core consisting of a series of supporting sections of such form in cross-section as to fit the outer cover except at the tread thereof, spacing blocks interposed between said sections and of a smaller diameter, means for connecting the spacing blocks and the supporting sections, and means for separating the core from the outer cover at the tread thereof whereby an air space is maintained between the core and the cover at the tread thereof, substantially as described.

4. A tire comprising a core formed of supporting sections of resilient material such as cork, rubber or wood, strengthening bands surrounding said sections diametrically, distance pieces between said supporting sections and a retaining ring on which said supporting sections and distance pieces are threaded, and one or more outer covers surrounding said core substantially as herein described.

5. A tire comprising a core formed of supporting sections spaced at intervals apart and each provided with an encircling hoop provided with an elastic tread portion, means for connecting said sections together, and one or more outer covers surrounding said core substantially as herein described.

6. A tire comprising an outer cover, a ribbed core, a layer of flexible material surrounding said ribbed core and an air tube arranged between said flexible layer and outer cover substantially as herein described.

7. A tire comprising an outer cover, a core formed of transverse supporting pieces smaller distance pieces arranged between said supporting pieces, a retaining wire or ring on which said supporting sections are held, a layer of flexible material surrounding said supporting pieces and an air tube held between said layer of flexible material and said outer cover substantially as herein described.

In testimony whereof we have signed our names to this specification in the presence of two subscribing witnesses.

EDWARD GREATBATCH WOOD.
ENOCH ARMITAGE.

Witnesses:
H. MERCER,
    30 *Derby Street, Prescot.*
F. M. C. SCOTT,
    89 *Victoria Street, Liverpool.*